No. 773,350. Patented October 25, 1904.

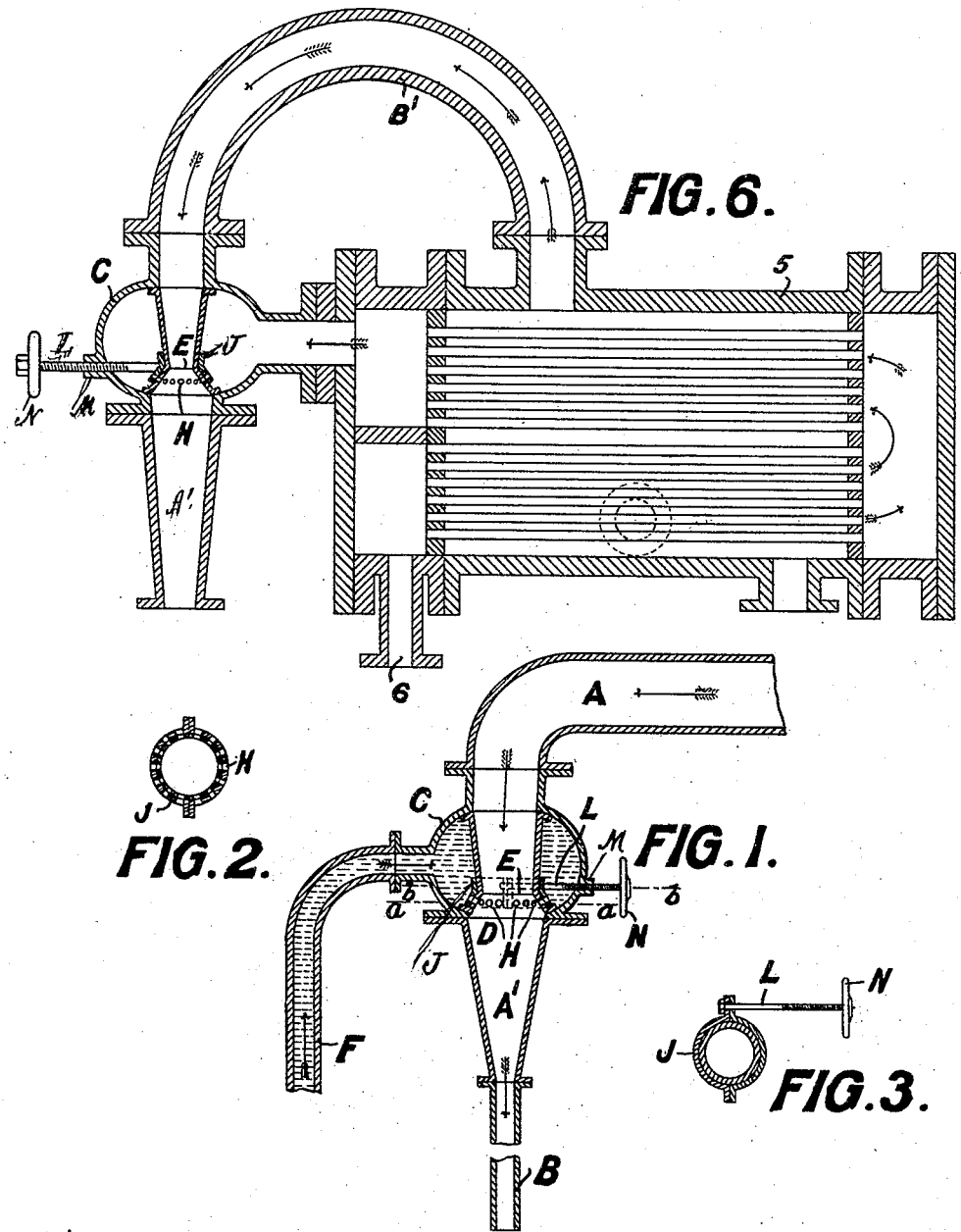

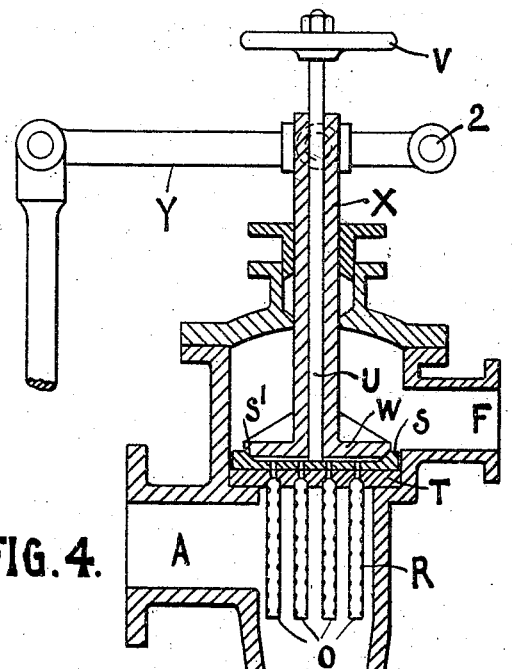
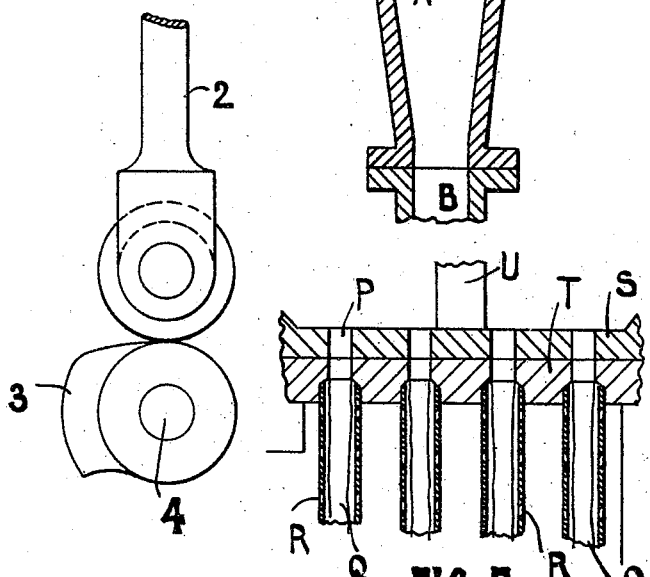

UNITED STATES PATENT OFFICE.

JAMES TINSLEY, OF EBBW VALE, ENGLAND.

CONDENSING EXHAUST-STEAM.

SPECIFICATION forming part of Letters Patent No. 773,350, dated October 25, 1904.

Application filed March 14, 1904. Serial No. 198,061. (No model.)

*To all whom it may concern:*

Be it known that I, JAMES TINSLEY, a subject of the King of Great Britain, and a resident of Ebbw Vale, in the county of Monmouth, in the Kingdom of Great Britain, have invented certain new and useful improvements in apparatus applicable for condensing exhaust-steam and other vapors and for setting up an induced current of air or gases to obtain a vacuum, (for which application has been made in Great Britain, No. 6,612, dated March 21, 1903,) of which the following is a specification.

This invention has for its object an apparatus applicable for condensing exhaust-steam and other vapors and for setting up an induced current of air or gases and removing them to obtain a vacuum.

In the accompanying drawings, Figure 1 is a vertical section showing my apparatus for condensing exhaust-steam and other vapors; Fig. 2, a transverse section on the line $a\,a$ of Fig. 1; Fig. 3, the same on line $b\,b$ of Fig. 1; Fig. 4, a vertical section of a different form of my apparatus; Fig. 5, a detail view of part thereof; Fig. 6, a vertical section, showing my invention applied to drawing off air and vapor from surface condensers.

Referring to Figs. 1, 2, and 3, A is the exhaust-steam pipe, B the vertical column into which this pipe A delivers the exhaust-steam. The column B is formed with a swelling or hollow inverted cone A', which forms an annulus D round the steam which is passing through the entrance to this chamber at E. I bring the exhaust-steam from the pipe A to the top of the high column B. Water is brought into the annulus D of the column B by means of perforations H. The water falling in an annular stream round the entrance E draws exhaust-steam entering at E down with it and at the same time condenses it, the water running out of the bottom of the column B into a suitable conduit, such as I. By this means all air and the condensed water are practically drawn out by the descending water. It will be found so great is the vacuum caused by the fall of the water that once started a siphon or strong pull is caused, which will draw up water from a cistern or other supply to the column B. Further, the exhaust-steam passing out will actually start a siphon by the suction which it creates round the entrance E. Consequently so long as the exhaust-steam is being emitted water is drawn or siphoned into the column through the perforations H and does its work. As, however, if there be a great fall in the column B the siphon might continue to run after the steam is shut off, a valve is arranged to stop the siphon or shut off the head of water or regulate the quantity of water entering the condenser, as the case may be. The valve is formed of a ring J, which seats itself on top of the sloping surface of the chamber A', this ring being perforated with holes which can be brought into register with holes H or rotated so as to bring them out of register, and thus shut off the flow of water which is drawn up through the pipe F into the closed tank C, the latter being in direct communication with the perforations. This ring can be operated by means of spindle L, which is coupled at one end thereto and at the other screwed into the fixed nut M and provided with a handle N. By turning the handle N, therefore, the ring J is turned one way or the other, so as to close or open the openings H. The apparatus could, if desired, be arranged in duplicate delivering into a single delivery-pipe, or more than two apparatuses can be provided, if required, delivering into one pipe. By bringing the exhaust-steam into the vertical column, down which a fall of water takes place, a strong pull is caused on the steam by the falling of the water independently of condensing about the same time the steam mingling with the falling water is condensed, and thus a perfect or nearly perfect vacuum is produced.

In the arrangement shown in Fig. 4 A is the pipe by which steam or other fluid is admitted, B the vertical column formed with a swelling or hollow inverted cone A', F the inlet-pipe for water, and O pipes through which cold water falls past the orifice of the steam-pipe A. The axes of these pipes are preferably not quite parallel, but converge slightly toward the vertical center line. The pipes are perforated at R, and the entrances P in the tube-plate T being smaller than the inside of the pipes an annulus is left round each jet of water Q, which is passing through the pipes. The velocity of the water falling through the pipes O draws part of the steam through the perforations R into the annular space round the jets of water which are falling into the hollow inverted cone A' and condenses it, and another part of the steam is drawn round the outside of the jets. By this means all steam is bound to be condensed, the water running out of the bottom of the column B. In order to regulate the quantity of water entering the condenser or shut it off entirely, a valve-plate S is provided, which seats itself on top of the tube-plate T. This valve-plate is perforated with holes which can be brought into register with the holes in the tube-plate T or rotated so as to bring them out of register, and thus shut off the flow of water from the pipe F. This perforated valve-plate S is operated by means of spindle U, which is provided at top with a handle V for turning it. In order to give an intermittent flow of water and regulate it automatically, I provide a second valve W, which seats itself in a seating S' in the valve-plate S, and it is freely mounted on a valve-spindle by means of a sleeve X. This sleeve is coupled to the rocking arm Y, which is pivoted at Z, said rocking arm being coupled to a rod 2, which is worked by means of a cam on the rotating shaft 4. The cam 3 is so arranged as to operate the rod 2, and so open the valve at the moment when the steam is being discharged through pipe A and close it when steam is shut off. This arrangement is useful in cases where the steam is discharged intermittently.

The invention is equally applicable for setting up an induced current of air or gases and removing them so as to obtain a vacuum. For instance, by means of a current of water flowing into the hollow inverted cone A' a vacuum or strong pull would be set up which would draw off the exhaust and create a vacuum in the cylinders of air and gas engines at the proper moment required, also in the case of surface condensers for marine engines this apparatus would do the work and displace the usual air-pumps. Fig. 6 shows the invention applied to this latter purpose, in which 5 is the surface condenser, 6 the pipe through which the circulating water enters the tubes of the condenser and which after passing therethrough is discharged into the closed tank C round the column B and in direct communication with the perforations H. The water falling in an annular stream round the entrance E draws air and vapor from the condenser through the pipe B' down with it. The induced current of air and vapor thus set up is removed through the pipe B.

I declare that what I claim is—

1. The combination with a vertical outlet column or pipe having an enlarged upper end, an inlet-pipe, for the fluid to be condensed, communicating with the said upper end, a water-chamber at the said enlarged upper end, and a series of perforations affording communication between the bottom of the water-chamber and the said enlarged upper end of the outlet-pipe, of a valve-plate having perforations corresponding with the first-named perforations, and a valve-stem leading from said valve to the exterior of the water-chamber.

2. The combination with a vertical outlet column or pipe having an enlarged upper end, an inlet-pipe for the fluid to be condensed, communicating with said enlarged upper end, and a water-supply chamber on top of said enlarged upper end; perforations being provided from the water-chamber into the top part of said enlarged upper end, of a perforated open-ended pipe leading down from every perforation; said pipes being of greater diameter than the water-inlet perforations with which they register.

3. The combination with a vertical outlet column or pipe having an enlarged upper end, an inlet for the fluid to be condensed, a water-chamber on top of said column or pipe, and provided with a bottom plate having a series of perforations, of a series of open-ended perforated pipes depending from said bottom plate into the enlarged upper end of the said column, and a valve controlling the first-named perforations.

4. The combination with an outlet column or pipe having an inlet at its upper end for the fluid to be condensed, a water-supply chamber on top of said column or pipe and having a horizontal bottom plate provided with a series of perforations, and a perforated valve-plate on said bottom plate, of means for operating said valve-plate.

5. The combination with an outlet column or pipe having an inlet at its upper end for the fluid to be condensed, a water-supply chamber on top of said column or pipe and having a horizontal bottom plate provided with a series of perforations, and a rotary valve-plate having perforations corresponding with those in the bottom plate, of a manually-operated means for operating said valve-plate, and an automatically-operated vertically-movable valve on the upper side of the perforated valve-plate.

6. The combination with an outlet column or pipe having an inlet at its upper end for the fluid to be condensed, a water-supply chamber on top of said column and having a horizontal bottom plate provided with perforations, open-ended perforated pipes depending from the bottom plate and of greater diameter than the perforations in the bottom plate with which they register, a perforated valve-plate on the bottom plate to regulate the size of its discharge-apertures, and a second valve on the perforated valve-plate to open and close its perforations, and means for operating said valves.

In witness whereof I have hereunto signed my name, this 1st day of March, 1904, in the presence of two subscribing witnesses.

JAMES TINSLEY.

Witnesses:
MATTHEW RALPH TINSLEY,
GEORGE TINSLEY.